UNITED STATES PATENT OFFICE.

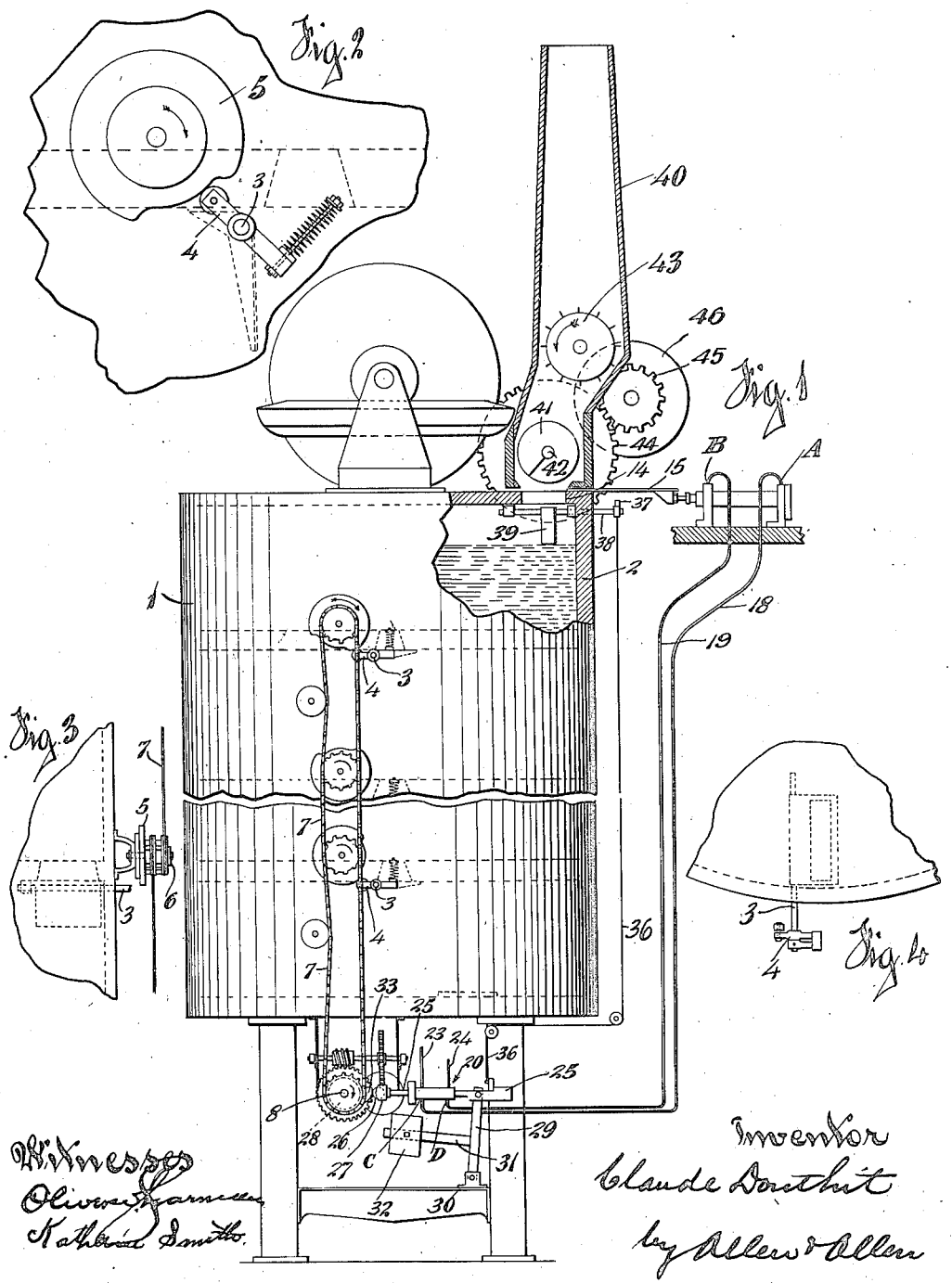

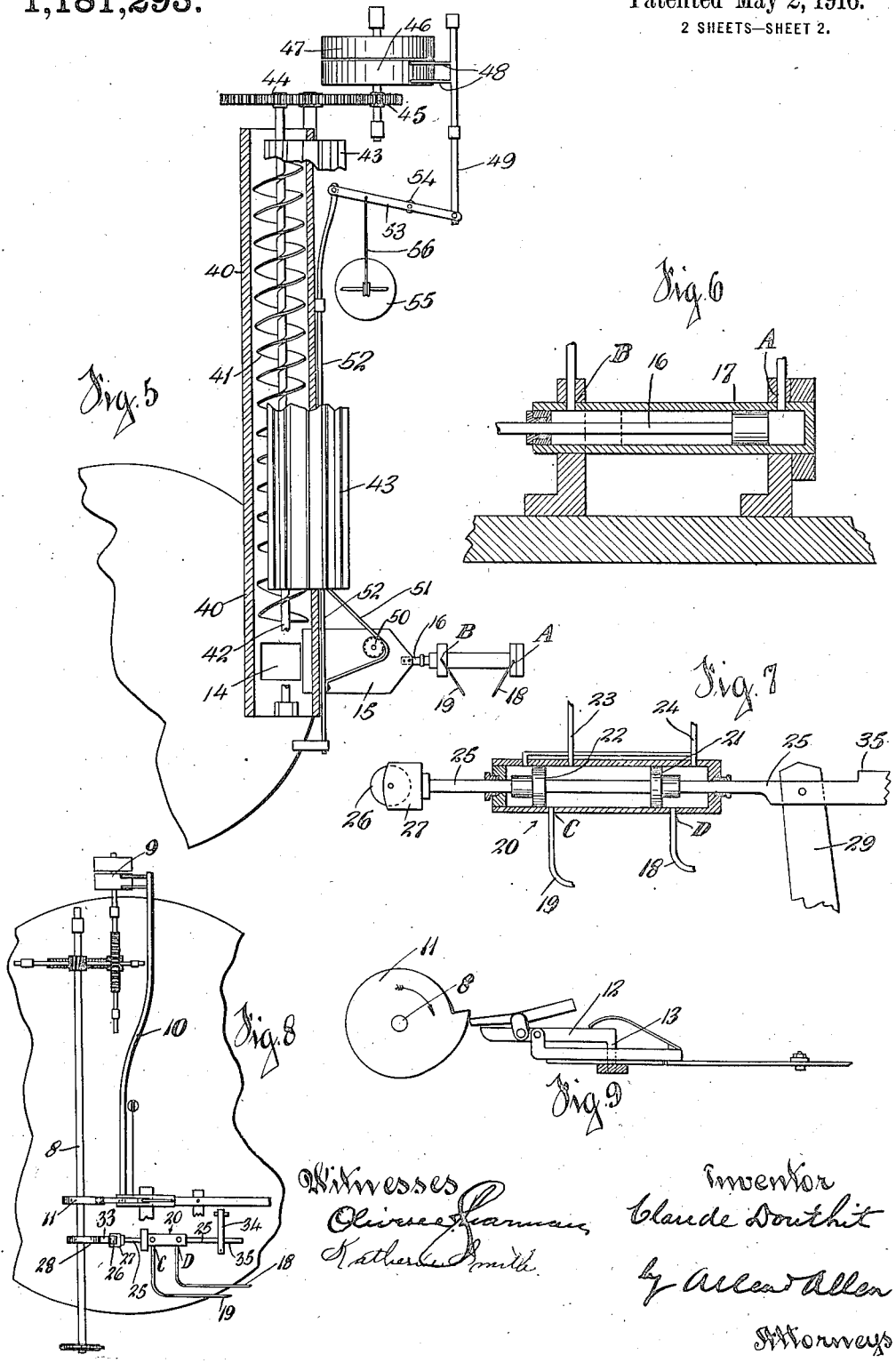

CLAUDE DOUTHIT, OF ATLANTA, GEORGIA, ASSIGNOR TO THE PROCTER AND GAMBLE COMPANY, OF CINCINNATI, OHIO, A CORPORATION OF OHIO.

STEAM-COOKER FOR OIL-BEARING MEAL.

1,181,293.

Specification of Letters Patent.

Patented May 2, 1916.

Application filed January 7, 1915. Serial No. 922.

*To all whom it may concern:*

Be it known that I, CLAUDE DOUTHIT, a citizen of the United States, and a resident of the city of Atlanta, in the county of Fulton and State of Georgia, have invented certain new and useful Improvements in Steam-Cookers for Oil-Bearing Meal, of which the following is a full, clear, and exact description, reference being had to the accompanying drawings, forming part of this specification.

My invention relates to improvements in steam cookers of the kind employed for cooking the meats of oil bearing seeds and the like preparatory to expressing the oil therefrom.

It relates particularly to improvements in the steam cooker shown and described in United States Patent No. 1,082,303, dated December 23, 1913, for steam cooker for oil bearing meal, issued to Albert B. Carr. As stated in the specification of said patent, the usual construction of cookers comprises a number of steam jacketed kettles arranged in a vertical series and having intercommunicating doors, and the said patent has as its purpose the providing of means for automatically opening the doors between the kettles in timed order, beginning with the door between the top kettle and the one below it, in order to overcome the difficulty resulting in a simultaneous opening of all doors, thereby allowing meal to fall clear through from the top to the bottom without a thorough cooking.

The said patent also discloses means for controlling the introduction of meal to the first or top kettle, whereby the height of the meal in said kettle regulates the admission of meal, but in which the admission was also controlled from the kettle door opening device, thereby holding the delivery door or gate to said top kettle closed until the kettle door opening device was in operation. In the device of the Carr patent, however, the delivery door was gradually closed by the rising of feed in the top kettle, and was therefore liable not to be completely closed when the effective use of the machine demanded that it should be. Moreover, attempts to regulate the amount of meats admitted to the top kettle were not practicable in said Carr device for the same reason.

The delivery door in the Carr cooker was necessarily a small one because it was swung on hinges and the weight of the wet meal above it forbade a very large door, whereby considerable time was lost in filling the top kettle. The accumulation of wet meats on the top of this door, moreover, frequently prevented its full closing. In the Carr device, also, there was no automatic means of controlling the feed of wet meats to the hopper in communication with the top kettle. The result of this was an accumulation of meats on the floor or some convenient place during the interval that the top door was closed, which meats would have to be shoveled into the cooker by hand.

It is the object of this invention to provide a means for delivering meats to the top kettle of such a cooker which has a comparatively large opening, opened and closed quickly and securely; and in connection with this, a conveyer to the delivery hopper which is automatically stopped by the closing of the delivery gate and started by the opening of it.

With these objects in view, my invention herein consists in that novel construction and arrangement of parts to be hereinafter specifically pointed out and claimed, in which a slide gate automatically and substantially instantaneously controls the feeding of grains into the cooker, and in doing so shifts the belt on a conveyer shaft to the delivery hopper.

In the drawings, Figure 1 is a front elevation of the cooker with the feed delivery cover of the top kettle in section and the belt shifting mechanism for the conveyer removed. Fig. 2 is a larger scale front elevation of one of the kettle door opening cams. Fig. 3 is a detail side elevation showing the chain and sprocket operating device for the kettle door opening cam. Fig. 4 is a top plan view of a kettle door shaft and its connection with the antifriction roller that rides on the cam shown in Fig. 2. Fig. 5 is a top plan view partly in section of the conveyer and belt shifter. Fig. 6 is a diagrammatic, vertical longitudinal section of the gate and belt shifting engine. Fig. 7 is a like section of the valve which controls the admission of steam, oil, water or air pressure to the engine. Fig. 8 is a plan view of the countershafting at the bottom of the cooker which controls the operation of the machine. Fig. 9 is a side elevation of the automatic stopping device for this shafting.

It is believed that a detailed description of that part of the cooker is unnecessary which is dealt with in the Patent No. 1,082,303, above mentioned. Such parts are the vertical series of steam jacketed kettles with the doors from each one to the other below it, and the chain and sprocket driven cam devices for opening and closing the doors, together with the belt shifting and stopping device at the base of the cooker (Figs. 1 and 8). The cooker tank is generally indicated by 1, with a top kettle 2. The three upper kettles have their kettle doors on shafts 3, on which the cam roller holders 4 are mounted with their rollers riding on the cams 5. The cams 5 are shown operated by sprockets 6, which are driven by chains 7 from the driving shaft 8, located below the cooker tank, all precisely as in the patent referred to.

The main driving pulleys 9, with slow speed worm gear transmission to the driving shaft 8 and with the belt shifter 10, are shown, and the means for automatically throwing the belt shifter into idle position by the cam 11 on the shaft 8, acting on the pivoted lever 12 with its slot engaging arm 13, are also shown (Figs. 8 and 9), exactly as in my former patent above mentioned.

As already stated, the invention herein deals exclusively with the delivery of meats to the top kettle. This delivery is made through a comparatively large opening 14 in the top kettle, which is opened and closed by a sliding gate 15, that is actuated by a motor. The piston rod 16 of the motor is connected direct to the gate, and the motor piston 17 is forced in one direction by applying pressure at the port A of the motor and forced in the other direction by applying pressure at port B, to close and open the gate respectively. It is designed to operate this motor by oil under pressure, although other means would easily suffice, and pipes 18 and 19 lead from the ports A and B respectively to the ports C and D of a valve mechanism 20 located adjacent to the countershafting beneath the machine (Fig. 7). This valve has two plungers 21 and 22, an intake pipe 23 from a source of low pressure oil and an exhaust 24 from the two ends of the valve cylinder. Mounted on the plunger rod 25 of this valve is an antifriction roller 26 in a box 27. The valve cylinder is positioned so that this roller is in proper position to contact with a cam 28 on the driving shaft 8. The piston or plunger rod 25 of this valve extends through the other end of the valve cylinder also, and slides on any suitable track (not shown) mounted on the standards of the machine. Pivoted to the rod at this point, with a slotted connection if necessary, is a lever 29, which is pivoted at the base in a suitable support 30. An arm 31 extends at right angles from this lever and has adjustably mounted on it a weight 32 (Fig. 1). This weight and lever tend to retain the plunger rod in such a position that the roller rides on the cam 28, and the plunger 21 (Fig. 7) maintains the port D of the valve cut off from the source of pressure through the intake pipe 23. When the nose 33 of the cam is turned to contact with the roller on the plunger rod, however, the plungers are moved so that the plunger 22 cuts off the port C from pressure and opens up port D thereto.

Since port D opens the line to port B of the gate motor, the normal position of the gate would be closed position if nothing intervened; but when the cam throws the plungers as described, the pressure is applied to the motor through port B, thereby opening the gate, by sliding it away from the opening 14 of the top kettle 2. Means are provided, however, whereby when the cam 28 opens the gate as above described, it remains open independently of the cam until the kettle 2 is filled to any predetermined point. For this purpose, any desired form of trigger 34 is provided, located so that when the plunger rod is pushed over to open the gate, the trigger will fall in front of a shoulder 35 formed on the rearward extension of the plunger rod heretofore referred to as a means of attachment for the weight lever 29 to the rod. This holds the valve in gate-opening position until the trigger is raised by a rope 36, which is secured at its other end to a lever 37 on the shaft 38 of a rider 39 in the top kettle.

It will be recalled that mechanism is provided for stopping the driving shaft after each complete rotation of the kettle door opening and closing mechanism, until positively started again by an operator. Accordingly, there can be no opening of the delivery gate unless the kettle door mechanism is in rotation, because the cam 28 on the driving shaft 8 is the only means of accomplishing this opening.

The foregoing description is believed to make it clear that once open, the gate cannot close until the rider in the top kettle is at the desired height and that having reached that height the gate is at once positively closed by the motor. The timing of the cam 28 is so arranged that its nose contacts with the valve antifriction roller just after the top kettle has been emptied in the second kettle and its door closed. The delivery opening can be quite large owing to the fact that the gate is a sliding one as distinguished from a hinged one, and the operation is quick, positive and complete and independent of pressure of meal on the gate. It is also designed to provide a conveyer to the delivery opening 14, closed and opened by the gate as now described, and to provide mechanism whereby the closing of the gate stops the conveyer from operating. In the drawings there is no hopper for the delivery opening shown, owing to the use of one end of the trough or bin 40, which is filled directly from a preliminary process to the cooking. A screw conveyer 41 on a shaft 42 is mounted in the bottom of the bin, and the conveyer convolutions end short of the delivery opening. This leaves a vacant space in the corner of the trough or bin, which receives no feed unless the conveyer is in operation, thereby filling for practical purposes the function of a hopper. The meal falls into the bin from the preceding milling processes, and the supply to the conveyer is regulated by an idle toothed cylinder 43 located above the conveyer in the bin.

The conveyer shaft 42 has a gear 44 on its far end, meshing with a pinion 45, actuated by a driving pulley 46. Coaxial with the driving pulley, as is customary in belt driven machinery, is an idler pulley 47. A belt shift 48, on a reciprocating rod 49, is employed to shift the belt from the idle to the driving pulley whenever the delivery gate is opened.

The delivery gate has mounted on its upper side (Fig. 5, not shown in Fig. 1), a roller or other abutment 50, in this instance a toothed wheel, which rides against the angling arm 51 of a frame which is secured to a reciprocating rod 52 suitably mounted on the bin or trough. This rod is pivotally connected to a lever 53, which has a fulcrum at 54, and at its other end is connected pivotally to the belt shifter rod 49. When the delivery gate is opened as shown in Fig. 5, the riding of the wheel 50 up the arm 51 pushes the rod 52 rearwardly, thereby pulling the belt shifter so as to set the conveyer in motion. When the gate is closed, a weight 55, pulling on a rope 56 secured to the lever arm 53, shifts the belt shifter over so as to move the belt onto the idler pulley 47. Thus it can be readily appreciated that when the kettle 2 is filled to the desired height with meats, the delivery gate is immediately and fully closed, and the conveyer is stopped, thereby avoiding the piling up of meats during the cooking operation.

It is desired in this specification, by reference to any one mechanical expedient, to include thereby any analogous expedients well known to any mechanic, whether specific reference was made to this fact at the time or not. No detailed exposition of the operation of the cooker itself seems to be necessary, in view of the fact that this is covered fully in the patent identified and referred to heretofore.

Having thus described my invention, what I claim as new and desire to secure by Letters Patent, is:

1. In combination with a series of kettles for cooking oil-bearing meal, a mechanism for opening and closing access of the kettles to each other, a gate at the receiving end of the first kettle of the series, a motor for opening and closing the gate, a mechanism for controlling the operation of the motor, and operative connection between the kettle mechanism and the motor controlling mechanism, for the purpose described.

2. In combination with a series of kettles for cooking oil-bearing meal, a mechanism for opening and closing access of the kettles to each other, a gate at the receiving end of the first kettle of the series, a motor for opening and closing the gate, a valve for controlling the operation of the motor, and operative connection between the kettle mechanism and the valve, for the purpose described.

3. In combination with a series of kettles for cooking oil-bearing meal, a mechanism for opening and closing access of the kettles to each other, a sliding gate at the receiving end of the first kettle of the series, a motor for moving the gate to open and closed position, a valve mechanism for controlling the motor, and operative connection between the kettle mechanism and the valve.

4. In combination with a series of kettles for cooking oil-bearing meal, a mechanism for opening and closing access of the kettles to each other, a gate at the receiving end of the first kettle of the series, a conveyer for delivering meal at said receiving end, means for operating the gate, a belt shifter for the conveyer and means on the gate for operating the belt shifter to stop the conveyer when the gate is closed.

5. In combination with a series of kettles for cooking oil-bearing meal, a mechanism for opening and closing access of the kettles to each other, a gate at the receiving end of the first kettle of the series, a motor for operating the gate, a conveyer for delivering meal at said receiving end, means for operating the gate, a belt shifter for the conveyer and means on the gate for operating the belt shifter to stop the conveyer when the gate is closed.

6. In combination with a series of kettles for cooking oil-bearing meal, a mechanism for opening and closing access of the kettles to each other, a sliding gate at the receiving end of the first kettle of the series, a motor for operating the gate, a conveyer for delivering meal at said receiving end, means for operating the gate, a belt shifter for the conveyer and means on the gate for operating the belt shifter to stop the conveyer when the gate is closed.

7. In combination with a series of kettles for cooking oil-bearing meal, a mechanism for opening and closing access of the kettles of the series to each other, a gate at the receiving end of the first kettle of the series, a reciprocating motor for opening and closing the gate, a valve for the motor and means on the kettle mechanism for throwing the valve to cause the motor to open the gate.

8. In combination with a series of kettles for cooking oil-bearing meal, a mechanism for opening and closing access of the kettles of the series to each other, a gate at the receiving end of the first kettle of the series, a reciprocating motor for opening and closing the gate, a valve for the motor, means on the kettle mechanism for throwing the valve to cause the motor to open the gate, means for maintaining the valve in open position, and a rider in the said first kettle to release the valve when the meal therein is at the proper height.

9. In a cooker having an upper or receiving compartment, mechanism for controlling the outflow of meal from said compartment, power driven mechanism operatively connected thereto for quickly controlling the access of meal to said compartment, thereby regulating said cooker as to time, and means controlled by the amount of meal in the compartment for setting into operation the controlling mechanism to shut off the said compartment from receiving meal, thereby regulating the cooker as to quantity.

CLAUDE DOUTHIT.

Witnesses:
   Coie Ward,
   J. W. Sykes, Jr.